(No Model.)
O. H. & C. W. JUDD.
WEED AND GRASS TURNING ATTACHMENT FOR PLOWS.
No. 283,116. Patented Aug. 14, 1883.
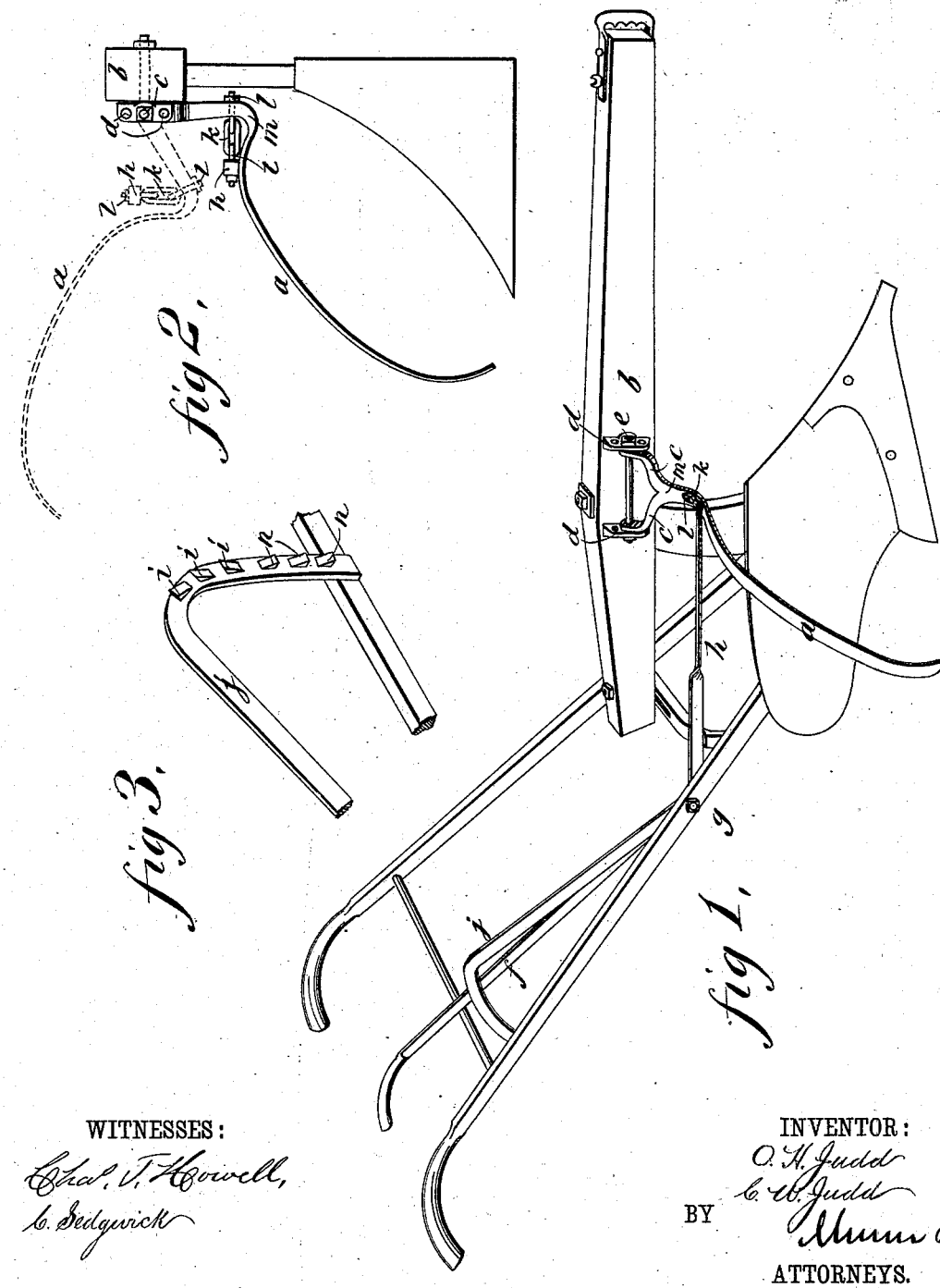

UNITED STATES PATENT OFFICE.

ORRIN H. JUDD, OF FAIRFIELD, NEBRASKA, AND CYRENIUS W. JUDD, OF MEADVILLE, PENNSYLVANIA.

WEED AND GRASS TURNING ATTACHMENT FOR PLOWS.

SPECIFICATION forming part of Letters Patent No. 283,116, dated August 14, 1883.

Application filed March 8, 1883. (No model.)

*To all whom it may concern:*

Be it known that we, ORRIN H. JUDD, of Fairfield, in the county of Clay and State of Nebraska, and CYRENIUS W. JUDD, of Meadville, in the county of Crawford and State of Pennsylvania, have invented a new and Improved Weed and Grass Turning Attachment for Plows, of which the following is a full, clear, and exact description.

Our invention consists, mainly, of the combination of a lever having a spring-arm, with a curved bar pivoted to the furrow-side of the plow-beam, and extending therefrom in a kind of bow shape to near the bottom of the furrow previously made, and being filled by the furrow-slice from the furrow being made, the said bar being located a suitable distance in advance of the mold-board to catch the grass, weeds, clover, or other growing crop being turned under for enriching the soil, and bend it over forward into the furrow, so as to be effectually covered therein and prevented from standing up between the furrow-slices, as it does, in large measure, when standing too high to be covered, without such an attachment, and grows instead of rotting, as it should. The said attachment is also contrived to be adjusted higher or lower for adapting it to different conditions, and by means of its spring-lever it is held to its work, so as to yield properly in case of too much resistance and for raising it up to allow of shifting the plow, all as hereinafter fully described.

Reference is to be had to the accompanying drawings, forming part of this specification, in which similar letters of reference indicate corresponding parts in all the figures.

Figure 1 is a perspective view of a plow with our improved attachment. Fig. 2 is a front elevation, and Fig. 3 is a detail, of the adjusting-lever contrivance.

We make a curved or bow-shaped bar, $a$, of suitable size and strength, to bear over the weeds, grass, and other growing crop to be plowed under, the said bar being jointed to the side of the beam $b$, preferably by branches $c$, suitably extended for substantially bracing the bar, the said branches being located between the brackets $d$, and secured by the pivot-bolt $e$, passing through said branches and brackets; but any equivalent method of fastening the bar may be employed. Said bar is adjustable for raising and lowering it on the beam by shifting the pivot-bolt to the different holes provided in the brackets for the purpose, the object being to set the bar according to the depth of the furrows to be made. The lower or free end of the bar is to run along the bottom of the furrow, and in order to hold it down thereto and prevent the grass, weeds, or other matters from forcing it up and preventing it from accomplishing its work, we employ a lever, $f$, to press it down, the lever being pivoted at $g$ to one of the plow-handles, and having a spring-arm, $h$, to bear with a yielding force on the bar, the lever being held by the spurs $i$ of a rack-bar, $j$, mounted on the plow-handle, for so holding the lever. The spring-arm $h$ of the lever is connected by a link, $k$, and eyebolts $l$ with the bar $a$, but rests on it, as represented in the drawings, when pressing the bar down; but when raising up the bar, as indicated by the dotted lines in Fig. 2, said bar hangs from the arm $h$ by the link.

In order that the pressure may be applied to the bar without causing the lower end to catch in the bottom of the furrow, the bar is constructed with an elbow, $m$, from which it extends vertically up alongside of the plow-beam, so that the pressure of the spring-arm takes effect mainly on the side of the beam, which forms a stop by which the downward thrust of the point of the bar is limited.

For holding the bar up in the dotted position the rack-bar $j$ has another series of spurs, $n$, pitched reversely to spurs $i$, for that purpose.

It will be seen that a properly-adjusted bar of this character will bear down all such growing plants as it is desirable to plow under, so as to be effectually covered in the furrows, thereby securing the effectual rotting of the whole and preventing the strong growths common along the margin of the furrow-slices for want of proper covering.

It is to be understood that one of the uses of the joint of the bar $a$ with the plow-beam is to allow the bar to rise when struck by obstructions—such as stones, sticks, roots, or sods— and pass them, which a rigidly-connected bar would be clogged with. Our bar will so facilitate the turning in and effectually covering of the plants that this most desirable method of fertilizing, now much neglected because of the difficulty of properly covering, will be much more frequently employed.

Having thus described our invention, what we claim as new, and desire to secure by Letters Patent, is—

1. The combination of a lever, $f$, having a spring-arm, $h$, with the weed and grass turner $a$, pivoted to the plow-beam, substantially as described.

2. The combination of a lever, $f$, having a spring-arm, $h$, with the weed and grass turner $a$, having branches $c$, pivoted by the bolt $e$ to the brackets $d$ of the plow-beam, substantially as and for the purpose set forth.

ORRIN H. JUDD.
     CYRENIUS W. JUDD.

Witnesses:
 JOSEPH J. HOLDEN,
 ELNATHAN GOODRICH.